United States Patent
White et al.

(10) Patent No.: US 8,122,021 B2
(45) Date of Patent: Feb. 21, 2012

(54) DOMAIN EXPERTISE DETERMINATION

(75) Inventors: Ryen W. White, Kirkland, WA (US); Susan T. Dumais, Kirkland, WA (US); Jaime Teevan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 12/246,046

(22) Filed: Oct. 6, 2008

(65) Prior Publication Data

US 2010/0088331 A1 Apr. 8, 2010

(51) Int. Cl.
G06F 17/30 (2006.01)

(52) U.S. Cl. .......................................................... 707/734

(58) Field of Classification Search .................... 707/734
See application file for complete search history.

(56) References Cited

U.S. PATENT DOCUMENTS

| | | | |
|---|---|---|---|
| 5,265,065 A * | 11/1993 | Turtle | 1/1 |
| 5,794,236 A * | 8/1998 | Mehrle | 1/1 |
| 5,799,268 A * | 8/1998 | Boguraev | 704/9 |
| 6,199,067 B1 * | 3/2001 | Geller | 1/1 |
| 7,774,339 B2 * | 8/2010 | White et al. | 707/722 |
| 2006/0064411 A1 | 3/2006 | Gross et al. | |
| 2006/0129533 A1 | 6/2006 | Purvis | |
| 2006/0242129 A1 | 10/2006 | Libes et al. | |
| 2007/0073641 A1 | 3/2007 | Perry et al. | |
| 2007/0174244 A1 | 7/2007 | Jones | |
| 2007/0208730 A1 | 9/2007 | Agichtein et al. | |
| 2007/0276803 A1 | 11/2007 | Shakib et al. | |
| 2008/0183759 A1 * | 7/2008 | Dehlinger | 707/104.1 |

OTHER PUBLICATIONS

Jansen, et al., "Real life information retrieval: a study of user queries on the Web", retrieved at <<http://jimjansen.tripod.com/academic/pubs/sigirforum98/forum98.pdf>> SIGIR Forum, vol. 32, No. 1, pp. 12.

Rieh, et al., "Patterns and Sequences of Multiple Query Reformulations in Web Searching: A Preliminary Study", retrieved at <<http://www.si.umich.edu/rieh/papers/rieh_asist2001.pdf>>, Proceedings of the 64th ASIST Annual Meeting, 38, 2001, pp. 246-255.

Tauscher, et al., "How people revisit web pages: empirical findings and implications for the design of history systems",retrieved at <<http://ijhcs.open.ac.uk/tauscher/tauscher.pdf>>, Int.J.Human-Computer Studies (1997) 47, pp. 97-137.

Agichtein, et al., "Improving Web Search Ranking by Incorporating User Behavior Information", retrieved at <<http://research.microsoft.com/~sdumais/sigir2006-fp345-ranking-agichtein.pdf>>, SIGIR'06, Aug. 6-11, 2006, Seattle,pp. 8.

(Continued)

*Primary Examiner* — James Trujillo
*Assistant Examiner* — William Spieler
(74) *Attorney, Agent, or Firm* — Russell S. Krajec; Krajec Patent Offices, LLC

(57) ABSTRACT

A user's domain expertise may be estimated through several factors by monitoring different aspects of a user's interaction with a web browser. Based on the user's domain expertise, search results may be presented to the user that is commensurate with their expertise, resulting in a more efficient and productive on line session. A user's expertise in a knowledge domain may be determined from the user's behavior, including analyzing search queries, monitoring how the user navigates between and through websites, and analyzing the specific cites visited. As a user interacts with a browser, the user's estimated domain expertise may be updated and used to provide appropriate and useful search results. In many embodiments, a user may have different expertise levels for different technical domains.

20 Claims, 3 Drawing Sheets

OTHER PUBLICATIONS

Agichtein, et al., "Learning User Interaction Models for Predicting Web Search Result Preferences", retrieved at <<http://www.mathcs.emory.edu/~eugene/papers/sigir2006preferences.pdf>>, SIGIR'06, Aug. 6-11, 2006, Seattle, pp. 8.

Bhavnani, Suresh K., "Important Cognitive Components of Domain-Specific Search Knowledge", retrieved at <<http://trec.nist.gov/pubs/trec10/papers/TREC-2001-04.pdf>>, pp. 10.

Bhavnani, Suresh K., "Domain-Specific Search Strategies for the Effective Retrieval of Healthcare and Shopping Information", retrieved at <<http://www-personal.si.umich.edu/~bhavnani/papers/Bhavnani-CHI-2002.pdf>>, CHI 2002, Apr. 20-25, 2002, Minneapolis, pp. 2.

Bhavnani, et al., "Strategy Hubs: Domain Portals to Help Find Comprehensive Information", retrieved at <<http://www-personal.si.umich.edu/~bhavnani/papers/Bhavnani_et_al_JASIST_2006.pdf>>, Journal of the American Society for Information Science and Technology, 57(1):4-24, 2006, pp. 21.

Collins, Michael, "Discriminative Training Methods for Hidden Markov Models: Theory and Experiments with Perceptron Algorithms", retrieved at <<http://people.csail.mit.edu/mcollins/papers/tagperc.ps>>, pp. 8.

Downey, et al., "Models of Searching and Browsing: Languages, Studies, and Applications", retrieved at <<http://research.microsoft.com/~horvitz/search_models_IJCAI-07.pdf>>, pp. 8.

Duggan, et al., "Knowledge in the Head and on the Web: Using Topic Expertise to Aid Search", retrieved at <<http://delivery.acm.org/10.1145/1360000/1357062/p39-duggan.pdf?key1=1357062&key2=4567487121&coll=ACM&dl=GUIDE&CFID=80732255&CFTOKEN=82043331>>, CHI 2008, Apr. 5-10, 2008, Florence, Italy, pp. 39-48.

Freund, et al., "Enterprise Search Behaviour of Software Engineers" Retrieved at <<http://delivery.acm.org/10.1145/1150000/1148297/p645-freund.pdf?key1=1148297&key2=3377487121&coll=GUIDE&dl=GUIDE&CFID=80732435&CFTOKEN=36709830>>, SIGIR'06, Aug. 6-11, 2006, Seattle, Washington, USA, pp. 645-646.

Holscher, et al., "Web Search Behavior of Internet Experts and Newbies", retrieved at <<http://www9.org/w9cdrom/81/81.html>>, Aug. 4, 2008, pp. 17.

Hsieh-Yee, Ingrid, "Effects of Search Experience and Subject Knowledge on the Search Tactics of Novice and Experienced Searchers", retrieved at <<http://www.asis.org/Publications/JASIS/Best_Jasist/1994Hsieh-Yee.pdf>>, Journal of the American Society for Information Science. 44(3), Apr. 1993, pp. 161-174.

Shen, et al., "Analysis of Topic Dynamics in Web Search", Retrieved at <<http://delivery.acm.org/10.1145/1070000/1062889/p1102-shen.pdf?key1=1062889&key2=4997487121&coll=&dl=&CFID=39350236&CFTOKEN=97740948>>, WWW 2005, May 10-14, 2005, Chiba, Japan, pp. 1102-1103.

White, et al., "Investigating Behavioral Variability in Web Search", Retrieved at <<http://delivery.acm.org/10.1145/1250000/1242576/p21-white.pdf?key1=1242576&key2=6618487121&coll=GUIDE&dl=GUIDE&CFID=80733044&CFTOKEN=61325347>>, WWW 2007, May 8-12, 2007, Banff, Alberta, Canada, pp. 21-30.

White, et al., "How Medical Expertise Influences Web Search Interaction", retrieved at <<http://research.microsoft.com/~sdumais/sigir2008-expertise-pp879-white.pdf>>, SIGIR'08, Jul. 20-24, 2008, Singapore, pp. 2.

White, et al., "Investigating the Querying and Browsing Behavior of Advanced Search Engine Users", retrieved at <<http://research.microsoft.com/cue/publications/WhiteSIGIR2007b.pdf>>, SIGIR'07, Jul. 23-27, 2007, Amsterdam, The Netherlands, pp. 8.

Wildemuth, Barbara M., "The Effects of Domain Knowledge on Search Tactic Formulation", retrieved at <<http://citeseerx.ist.psu.edu/viewdoc/download;jsessionid=3045301AB399D684DACB0B70B8FBE024?doi=10.1.1.103.177&rep=rep1&type=pdf>>, Journal of the American Society for Information Science and Technology, 55(3), 2004, pp. 246-258.

* cited by examiner

DOMAIN EXPERTISE DETERMINATION

BACKGROUND

Users of the world wide web use many different techniques and mechanisms to find information they desire. Users may perform queries in general purpose or specialized search engines. Users may browse to various sites with which they may be familiar.

Users often use the world wide web to find information relating to their expertise. For example, a physician may research a disease or condition for a patient that they may treat. Because of the physician's expertise, the physician may wish to see a different level of technical information than the patient or other layperson would want to see concerning the same disease. The patient may want to see broad overview of the disease and some general explanation of different treatments for the disease, while the physician may wish to understand the details of the potential causes of the condition and tradeoffs between each course of treatment so that an appropriate treatment may be selected.

SUMMARY

A user's domain expertise may be estimated through several factors by monitoring different aspects of a user's interaction with a web browser or other application. Based on the user's domain expertise, search results may be presented to the user that is commensurate with their expertise, resulting in a more efficient and productive on line session. A user's expertise in a knowledge domain may be determined from the user's behavior, including analyzing search queries, monitoring how the user navigates between and through websites, and analyzing the specific sites visited. As a user interacts with a browser, the user's estimated domain expertise may be updated and used to provide appropriate and useful search results. In many embodiments, a user may have different expertise levels for different technical domains.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
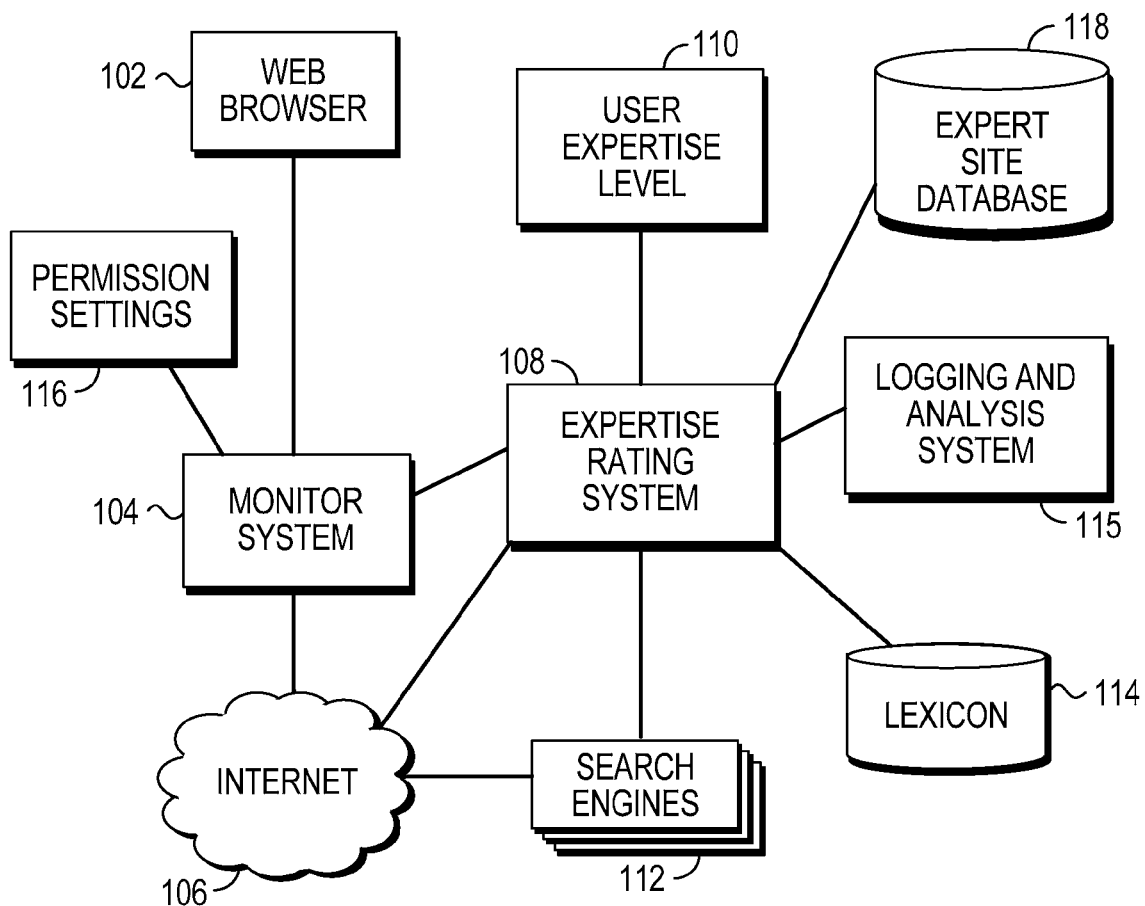
FIG. 1 is a diagram illustration of an embodiment showing a system with an expertise rating system.

A user's domain or technical expertise may be determined through a user's behavior with a web browser. Once the level of domain expertise is determined, search results may be tailored to the user.

Users with technical expertise in a particular field tend to use the World Wide Web in a different manner than novices who do not possess the same technical expertise. In many cases, the same person may use the World Wide Web differently when operating within their area of technical expertise than when the same person is searching for something with which they are not familiar.

As a general rule, people with technical expertise in a specific field tend to perform search queries in different manners than novices, visit technically oriented websites, and perform searches with a greater number of branches. An expert's queries tend to use more technical language and tend to be longer and more directed. A technical expert may visit sites that contain technical and detailed information, and technical experts tend to have longer sessions, visit more sites, and branch their searches many more times than novices.

By monitoring a user's behavior with a web browser, an assessment of a user's technical domain expertise may be determined. In many cases, a user's expertise may be determined and refined over many browsing sessions. As measurement of the user's expertise is refined, the user expertise factor may be used by a search engine to enhance the search results for the user. In cases where the user is an expert, the search results may increase the rank of sites with technical details, and increase the rank of sites that are visited by other experts. In cases where the user is not an expert, the search results may increase the rank of summary or overview sites that have little technical jargon and detail.

A system for determining technical expertise may be implemented in several manners. In one embodiment, a system may operate as part of a search engine and may track a person's web browsing from the interaction with the search engine. In another embodiment, a monitoring system may operate at least in part on a local device or a remote server to process a user's search queries as well as other web browsing.

In embodiments where a monitoring system may have access to Personally Identifiable Information (PIT), a permission system or agreement may be in place to permit or deny access based on the permission granted by the user. In some embodiments, a monitoring system may use data that has been scrubbed of any PII and such data may be anonymous and untraceable to the user.

Throughout this specification, the term 'domain' and 'technical domain' is used to refer to a technical area of competence, as opposed to a 'web domain' which refers to a second or third level domain address for a website. A technical domain of expertise refers to a technical area or subject matter. A technical domain may be broad, such as the technical expertise associated with mathematical or computer science, or the technical domain may be narrow, such as the technical expertise associated with virtual server architecture within the broad technical domain of computer science.

A technical domain can be any classification of human knowledge and are not limited to science or technology based fields. Examples of a technical domain may include hobbies such as knitting, biking, or raising tropical fish. Other examples may include sports topics, such as professional football, athletic activities at a specific college, or coaching children's soccer. Still more examples may include a general topic of interest such as landscape photography, the writings of Plato, or any other classification of human knowledge.

Throughout this specification and claims, reference is made to a "web browser". The term "web browser" may include any device, application, or system that may gather and display information from disparate sources across a network, and where a user may search and browse such information. One example of such a system may be a browsing application that may display information from servers using Hyper Text Transport Protocol (HTTP). Some servers may contain databases of links to other servers, and may respond to search queries by presenting a list of such links that are related to a search query.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for monitoring a web browser and determining a user expertise level. Embodiment 100 is a simplified example of the functional components that may make up a system that can determine a user expertise level and use the expertise level to return useful results from a search engine.

The diagram of FIG. 1 illustrates functional components of a system. In some cases, the component may be a hardware component, a software component, or a combination of hardware and software. Some of the components may be application-level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of the functional components that may determine and use a user's expertise within a subject matter domain. Based on the user's expertise, a search engine may return results that are tailored or modified to better match the user's expertise.

Embodiment 100 may determine a user's expertise level using many different classification schemes and mechanisms. In some embodiments, a user may be classified as either an "expert" or "non-expert". In other embodiments, a user's expertise tray be represented on a continuum, such as a numerical value.

The information about a user's expertise level may be used in several different ways in the search experience. For example, the expertise level may be used to retrieve different results for experts and non-experts. In another example, the results may be displayed in different ways based on expertise level. In yet another example, query or site suggestions may be made based on expertise level. In still another example, strategic guidance may be provided for non-experts that may not be provided for experts.

A web browser 102 may be connected to a monitoring system 104 that may process or monitor communications between the web browser 102 and the internet 106. The monitor system 104 may interact with an expertise rating system 108 that may be used to determine a user expertise level 110. The monitor system 104 may actively or passively receive messages from the web browser 102. When actively receiving messages, messages may be routed through the monitor system 104 for processing. For example, one embodiment may have messages sent from the web browser 102 that are addressed to the monitor system 104. The monitor system 104 may process the messages, receive responses from various web servers, such as the search engines 112, and transmit the responses back to the web browser 102. Such an embodiment may include a monitoring system that is an add-on or other component of a web browser 102 operating on a local device, or as a server, proxy, or other component that operates on a remote server. In some active embodiments, the monitor system 104 may be incorporated into a search engine, for example.

In a passive operation, the monitor system 104 may examine communications between the web browser 102 and servers located on the internet 106, but without having the messages addressed to and processed by the monitoring system 104. For example, such an operation may include monitoring log files of a communication session or collecting the activities of the web browser.

The monitor system 104 may collect information or route communications that may be used by an expertise rating system 108. The expertise rating system 108 may determine a user expertise level 110 through several different mechanisms.

The user expertise level 110 may be an estimated or calculated measurement of a user's expertise or knowledge in a specific technical domain. In many cases, each user may have different levels of expertise in different technical domains. For example, an accomplished astrophysicist may have a very high level of expertise in astrophysics, but little expertise in cooking. Similarly, an executive chef who is a culinary school graduate may have a high level of expertise in cooking, but only a passing interest in astronomy.

When people with different levels of expertise perform a search or browse the Internet 106, their expectations and abilities to comprehend the subject matter can be vastly different. Using the previous example, when the astrophysicist searches for "baking" and "cinnamon", the astrophysicist may be searching for a recipe for cinnamon buns. When the executive chef searches for the same general terms, the chef may be searching for articles that discuss the identification and selection of specific varieties of cinnamon or how the spice interacts with other ingredients during baking. Similarly, the chef may search for "Mars" to understand the basic properties of the fourth planet, while the astrophysicist may want to find scientific papers discussing Mars.

In each case, the level of detail that could be comprehended and understood by the recipient is different and is based on their domain expertise. Thus, the search results that are relevant to an expert in a subject may be irrelevant to a novice, and vice versa. By determining an estimated expertise level for a user, more relevant search results may be presented, which may enhance the user's search experience.

As a user gathers more information and learns more about a subject, the user may desire to see increasingly detailed and increasingly expert-level material on the subject. In many cases, the process of searching the Internet may raise a user's expertise level over time.

When search results are presented to a novice, some embodiments may have a section of 'expert' level results that may also be presented. The expert level results may be present to enable a user to explore some of the more detailed information on a topic and thus increase their knowledge even further than a typical novice level search result. In the example above, the search results for the astrophysicist's search for "baking" and "cinnamon" may include a section of expert results that may be more appropriate to the culinary school graduate, in addition to recipes for cinnamon buns. Some embodiments may present the expert level material under a separate heading or somehow visually demarked.

The expertise rating system 108 may determine or estimate a user expertise level 110 through several different mechanisms. In some embodiments, the expertise rating system 108 may store and periodically update a user expertise level 110 for various technology domains. Each time the expertise rating system 108 may analyze a user's action, the user expertise level 110 may be updated and stored. In embodiments where the user expertise level is stored, the user expertise level may be recalled at the beginning of a new session.

A user's expertise level 110 may be stored in a manner that associates a particular user with the user expertise level. For example, a cookie or other storage mechanism may be stored on a device on which the web browser 102 operates. The cookie may contain the user expertise level for specific technology domains and may be queried and updated by the expertise rating system 108.

In some embodiments, the user expertise level 110 may be stored on a remote server. In one such embodiment, a search engine may store and update a user expertise level associated with a specific search session, but such an expertise level may or may not be associated with a specific user or device on which the web browser 102 operates. When the expertise level is associated with the specific user or device, the user may log onto an account with a search engine and may set various permission settings 116 that may acknowledge that the search engine may store parameters that may include the user's expertise level.

One mechanism for accessing the user's expertise level is to analyze a query to a search engine 112. The query may be examined against a lexicon 114 of technical terms to determine a level of expertise based on the query alone. The lexicon 114 may contain a database of technical terms that may be associated with different technical domains. In many embodiments, the analysis with the lexicon 114 may determine both a technical domain as well as a level of expertise within that domain. In some embodiments, a sequence of queries may be analyzed over time or collectively to determine a user's expertise.

Queries from experts tend to contain more technical words than novices, and experts tend to use some technical words that would not be used by novices. Since each technical domain may have its own jargon and terminology, those who use the terminology in a search are more likely to be expert in the field.

In a simple embodiment, a lexicon 114 may include terms that, if used, indicate that the query is from an expert. For example, a query for a medical condition that includes a complex medical term "amyotrophic lateral sclerosis" may indicate that the query is from an expert in the medical field, while a similar query for "Lou Gehrig's Disease" would be assumed to be from a novice. Both queries are for the same medical condition, but different results may be presented, with the former containing mainly technical information that a physician or other expert may comprehend while the latter may have more information suited for a layperson.

In a more complex embodiment, a lexicon 114 may include expert ratings for different words or phrases. Some words or phrases may be more indicative of an expert in the field than others. The analysis with the lexicon 114 may include combining the various words or phrases to give a score or numerical value for expertise based on the query. For example, a query may contain multiple terms, some of which have a higher expert rating than others. A query against the lexicon 114 may return expert ratings for each technical term, and a formula or algorithm may be used to calculate an expertise level based on an average, maximum, or other computation of the expert ratings.

Some embodiments may estimate a user expertise level using a numerical score. Other embodiments may use a qualitative mechanism, such as defining a user as 'expert' or 'novice'. Whether a user expertise level is defined using a numerical score or qualitatively, such a definition may be used in a ranking algorithm to rank or group search results that would be applicable to a particular user.

In many embodiments, a monitor system 104 and expertise rating system 108 may be incorporated into a search engine 112. In such an embodiment, the functions of analyzing a query and determining a user expertise level 110 based on the query may be performed separately for each search session. For example, a user may establish an HTTP session with a search engine, transmit a query, the query may be analyzed for a user expertise level, and the search engine may return results based at least in part on the calculated user expertise level. In such an embodiment, the user expertise level 110 may be calculated new for each search session.

In some such embodiments, a user may receive a cookie associated with the web browser 102 that includes the user expertise level 110. In other embodiments, the user expertise level 110 may be stored by the search engine and recalled when the user logs onto an account with the search engine or otherwise is identified to the search engine. In cases where user information could be stored with personally identifiable information, the permission settings 116 may allow or deny such practice based on a user's consent.

In some embodiments, the monitor system 104 may monitor other portions of a browsing session, such as monitoring branchiness of a search. Experts in a domain tend to have searches that have many branches, where the expert may follow a link, then retrace their steps and follow a different link. In general, an expert in a domain often attempts to compare or confirm one source against another when doing a search within their field of specialty, and an expert will visit more different web sites, as measured by a second level domain or third level domain web address.

A logging and analysis system 115 may be capable of monitoring and measuring the branchiness of a search. In an embodiment where the logging and analysis system 115 is a component of a search engine, the logging and analysis system 115 may monitor a user's interaction with a search results page to log when a user selects one search result then returns to the search page and selects another search result.

In another embodiment, the monitor system 104 may be capable of measuring branchiness from any web browsing session, including browsing through websites that are not related to a search engine. In such an embodiment, the monitor system 104 may collect website visitation information that may be in a log or history file and determine a branchiness evaluation based on the actual history of one or more browsing sessions.

The logging and analysis system 115 may determine the branchiness for a single session or for two or more sessions that relate to a specific topic. In many cases, a session may be defined as a session that operates until the web browser is closed or until the web browser is idle for 30 minutes. Such a definition of a session is arbitrary and in some cases, a user may let a session lapse for more than 30 minutes or close a web browser for a variety of reasons.

In many cases, a web browser 102 may have tabs or windows in which different web pages may be displayed. In some cases, a user may have two or more different web browsers operating on a single device, and may have multiple instances of each web browser displayed. In such a case, the logging and analysis system 115 may aggregate the web interactions from different instances of web browsers, from different tabs or windows within each web browser, and from web browsers manufactured by different manufacturers. In such a case, the aggregated actions of a single user across multiple browsers, multiple instances of each browser, and multiple windows or tabs within each instance may be consolidated and analyzed to determine branchiness.

Technical domain experts and novices tend to visit different websites. In many cases, specific pages or second level domains may indicate that a user is a technical expert. For example, registered users of for-fee websites or websites that have a registration process can be a very strong indicator of a user's expertise in a field. In one example, a user who accesses Private PAIR through the uspto.gov website may be considered an expert in patent law. In the example, registered patent attorneys, agents, and their associates are permitted to access Private PAIR after verifying their identity and receiving credentials. Similarly, a user who visits a site directed toward laypersons may be considered a novice.

In many cases, users may start a browsing session with a website as opposed to a search engine. Such a website may be a good indicator for the user's technical expertise. For example, a user who starts a session with a technically oriented website may be considered to be an expert, as opposed to a novice who may start a session with a website oriented toward laypersons.

Experts may also select technically-oriented websites over layperson-oriented websites during a search or throughout a browsing session. As a user becomes expert in a topic, the user may become familiar with the content provided on certain websites and may wish to revisit the sites. Thus, some embodiments may increase a user's expertise level when the user visits such sites frequently.

In some embodiments, an expert site database 118 may contain a list of websites that are frequently visited by experts and novices. A website may be queried against the expert site database 118 to determine a technical domain and an expert level for the website.

The expert site database 118 may be populated in several different ways. In one method, the websites visited by other experts in a technical domain may be cataloged and ranked based on the visits by the other experts. In such an embodiment, a website may have an expert level repeatedly updated as experts or novices access the website.

In another method, a website that is not in the database may be assigned an expert level based on an analysis of keywords from the website. The website may be scanned to identify one or more keywords and the keywords may be analyzed using the lexicon 212 to determine an expert level for the website.

In still another method, a website that is not in the database may be assigned an expert level based on an analysis of link patterns. For example, a website's expert classification may be inferred based on the classification of websites that link to the website or classification of websites to which the website links. In yet another method, a website's classification may be determined by analyzing the expertise level of users who visit the website.

The expert level of a website may be static or dynamic. In a static ranking, a single determination of a website's expert level may be performed by keyword analysis, through session log analysis, or through a combination of analyses. The single determination may be stored in an expert site database 118 and may not be further analyzed. Some embodiments may perform a second analysis when the website has changed or been updated.

In a dynamic ranking, an initial determination of a website expert level may be made through session log analysis or keyword analysis and stored in the expert site database 118. The expert level may be updated over time as users subsequently visit the website. The expert level may be changed based on users that were previously identified as experts or novices.

The expert site database 118 may contain references to specific pages within a website for which individual expert levels are determined, or may contain a summary expert level that may apply to groups of pages, third level domains within a website, or an entire second level domain for a website.

The architecture of embodiment 100 may be structured differently in various embodiments.

In many embodiments, the functions of a monitor system 104 and expertise rating system 108 may be part of a general purpose or other search engine. When a user sends a query to the search engine, an expertise rating system 108 may evaluate the query to determine an expert level based on the query, and may return search results that are ranked differently, grouped differently, or may present different results altogether based on the user's expertise level. Such an embodiment may also monitor the sites selected by the user and monitor the branchiness of a search based on the user's selection from a search results page.

In many such embodiments, a user's expertise level may be stored and recalled by a search engine. In some cases, a search engine may store and update a user's expertise level just for a session, or may identify the user in some manner and may recall the user's expertise level and update the same with each session. One mechanism for storing a user's expertise level is to store such information in a cookie on the device operating the web browser 102.

When a search engine or other remote server stores a user's expertise level, the stored data may be anonymous and may be tacked by some identifier with which no personally identifiable information may be associated. In some embodiments, a user may log onto a search engine or have an account in which the user may give express permission to store data about the user, including the user's expertise level.

In some embodiments, some or all of the functions of the monitor system 104 may be operable as part of the web browser 102 or as a local process operating on the same device as the web browser 102. In such an embodiment, a more detailed and complete log of a browser session may be analyzed. For example, such a monitor system 104 may be able to detect when a user starts a browser session at a technical website and browses from one website to another website without using a search engine. Such an embodiment may be able to assess and update a user's expertise level based on the websites visited and the branchiness of their browsing.

Some embodiments may implement the monitoring system 104 as a proxy or other site through which all web browsing and searching messages may pass. Such a system may be within a local area network, such as an employer's network. Another version may be a proxy service that is offered by a third party which may or may not provide search services. Such a version may store user information anonymously or may have a permission setting 116 that permits such information to be gathered with or without personally identifiable information.

Figure 2:
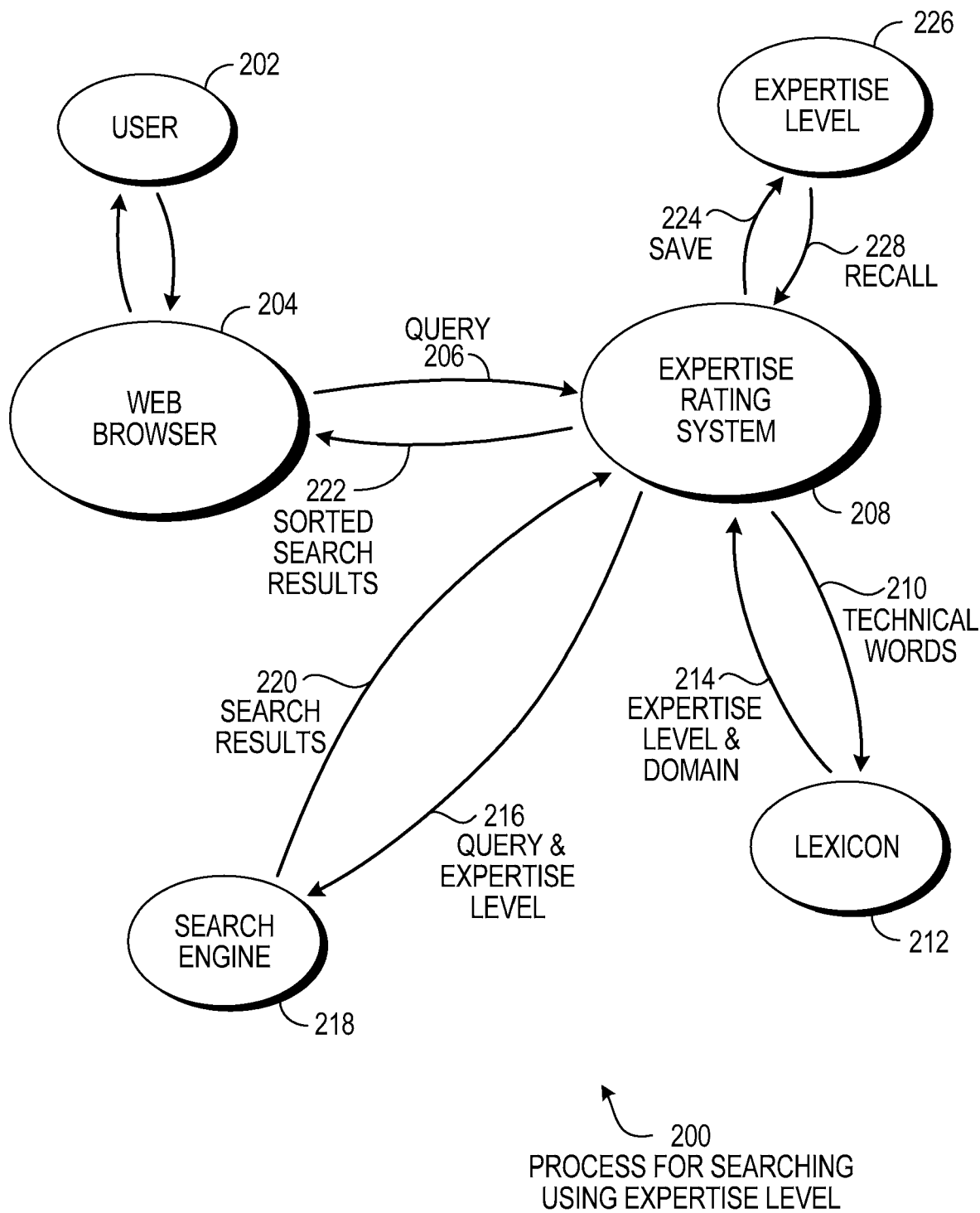
FIG. 2 is a process diagram illustration of an embodiment showing a process for searching using an expertise level.

FIG. 2 is a process illustration of an embodiment 200 showing a process or method or searching using a user's expertise level. Embodiment 200 is a simplified example of some of the steps that may occur when processing a search query to determine a user's expertise level, then using the expertise level with a search engine to tailor search results for the user.

Other embodiments may use different sequencing, additional or fewer steps, and different nomenclature or terminology to accomplish similar functions. In some embodiments, various operations or sets of operations may be performed in parallel with other operations, either in a synchronous or asynchronous manner. The steps selected here were chosen to illustrate some principles of operations in a simplified form.

Embodiment 200 is an example of some of the operations that may be performed to analyze a search query for a user's expertise level. The expertise level may be used by a search engine in various manners to tailor search results for a user's expertise level.

A user 202 may interact with a web browser 204. The web browser 204 may be any form of application through which a user may select a web page to view, and through which the page may be displayed. Many web pages have hyperlinks or other navigational tools that may allow the user to move from one page to another within a website or to move to other websites to view pages. Many web browsers may have a list bookmarked web pages that a user may access directly, and/or may have text boxes in which a user may type a website address to access a website.

In many embodiments, the web browser 204 may be used to access web content from another device. Most web browser embodiments are used for browsing content accessible over the Internet. Other web browser embodiments may be used to access content available on a local device or local area network.

A user 202 may generate a query 206 that may be transmitted from the web browser 204 to an expertise rating system 208. The expertise rating system 208 may be a function operable on a search engine website, for example. Other embodiments may use an expertise rating system 208 that operates within a local area network or may operate in part on the local device on which the web browser 204 may operate.

The expertise rating system 208 may identify one or more technical words 210 from the query 206, and may send the technical words 210 to a lexicon 212. A query to the lexicon 212 may return an expertise level and domain 214.

The lexicon 212 may contain a database for which various technical words may have an expertise level defined. Some such databases may define an expertise level to individual words or may include multiple words as phrases. Some embodiments may have an expertise level based on a numerical scale. A lexicon 212 may include an algorithm for calculating an expertise level based on the number and expertise level of the technical words in the query 206. In general, a higher expertise level may be given for those queries with the largest number of technical words, and for those queries having technical words with high expertise levels.

In an example above, a search query for "amyotrophic lateral sclerosis" may indicate that a user has more of a technical expertise in medicine than a search query for "Lou Gehrig's Disease", even though both queries refer to the same topic. A lexicon 212 may identify the technical terms "amyotrophic", "lateral", and "sclerosis" as technical terms in the medical field, and may rate each word as highly expert. The combination of three highly technical terms may return a result that the query is from an expert. In some embodiments, the lexicon 212 may analyze the phrase "amyotrophic lateral sclerosis" as a single phrase and may return a similar analysis.

When the lexicon 212 analyzes the phrase "Lou Gehrig's Disease", each word "Lou", "Gehrig's", and "Disease" may not be a highly technical term, but the reference to "Disease" may indicate that the query relates to the medical field. The term "Lou Gehrig" may be found to relate to the technical field of baseball, and thus an analysis may return a low expertise level relating to the technical field of medicine and a medium expertise level relating to the technical field of baseball, for example.

In many embodiments, a lexicon 212 may contain technical words relating to many different technical domains. Some embodiments may include broad technical domains, such as computer science or medicine, while others may include detailed sub-categories of technical domains, such as neurosurgery within medicine or compiler design within computer science.

Many embodiments may define technical domains for any type of knowledge, pursuit, hobby, avocation, or interest imaginable. Examples of technical domains may include tropical fish, dairy cattle operations, knitting, amateur radio, college football, state politics, or any other imaginable interest.

After determining an expertise level, the expertise rating system 208 may transfer the query and expertise level 216 to a search engine 218. The search engine 218 may use the expertise level 216 in several different manners to return sorted search results 220 that are tailored to the user expertise level.

In one embodiment, a search engine 218 may perform a generic search using the query as defined by the user 202. After the generic search is performed, the results many be sorted or organized based on the user expertise level. Many search engines perform a query and rank the results of the query based on several factors. In such an embodiment, the user expertise level may be used to rank technical results higher than non-technical results for an expert in a field, but may rank less technical results higher than technical results when the user is a novice.

In another embodiment, the search engine 218 may use the expertise level to adjust a query to increase or decrease the technical sophistication of results. Such an adjustment may be made prior to submitting the query to a search engine database. In some embodiments, the expertise rating system 208 may perform such an adjustment or modification to a query prior to sending the query to the search engine. An example of such an adjustment may be to include an expertise rating as a variable within a search query.

An example of adjusting the search query may be to add or remove technical terms to a search query so that the search query returns results that are commensurate with the user's expertise level. For example, when a user who has a layperson's expertise level in medicine searches for "amyotrophic lateral sclerosis", the search query may be modified to add "Lou Gehrig's Disease". In some cases, the search query may replace "amyotrophic lateral sclerosis" with "Lou Gehrig's Disease".

An expertise rating may be a parameter to a search engine that may be used to fetch different results based on expertise. In some cases, an expertise rating may be used to categorize, rank, or group results differently. A search engine may present results using different visual formats or different visual organization based on expertise level.

After performing a search, the search engine 218 may return a group of search results 220. The expertise rating system 208 may, in some embodiments, organize, group, or further sort the search results using the expertise level to send a set of soiled search results 222 to the web browser 204 for display.

In many embodiments, a user's expertise level may be saved 224 and stored as an expertise level 226. On subsequent searches, the expertise level 226 may be recalled 228 and used as a basis for further expertise level determination.

In many embodiments, a previously stored user expertise level 226 may be a starting point for determining a user's expertise level by an expertise rating system. For example, a user may have previously performed a search using a query with a very high expertise level. A subsequent query within the same technology domain may have a different calculated expertise level, but the user's new expertise level may be calculated based on the old expertise level and the newly analyzed query. Various formulas, heuristics, or algorithms may be used to determine a new expertise level. One such mechanism may be to apply an exponentially weighted moving average time series technique or some other mechanism to calculate a new expertise level.

Figure 3:
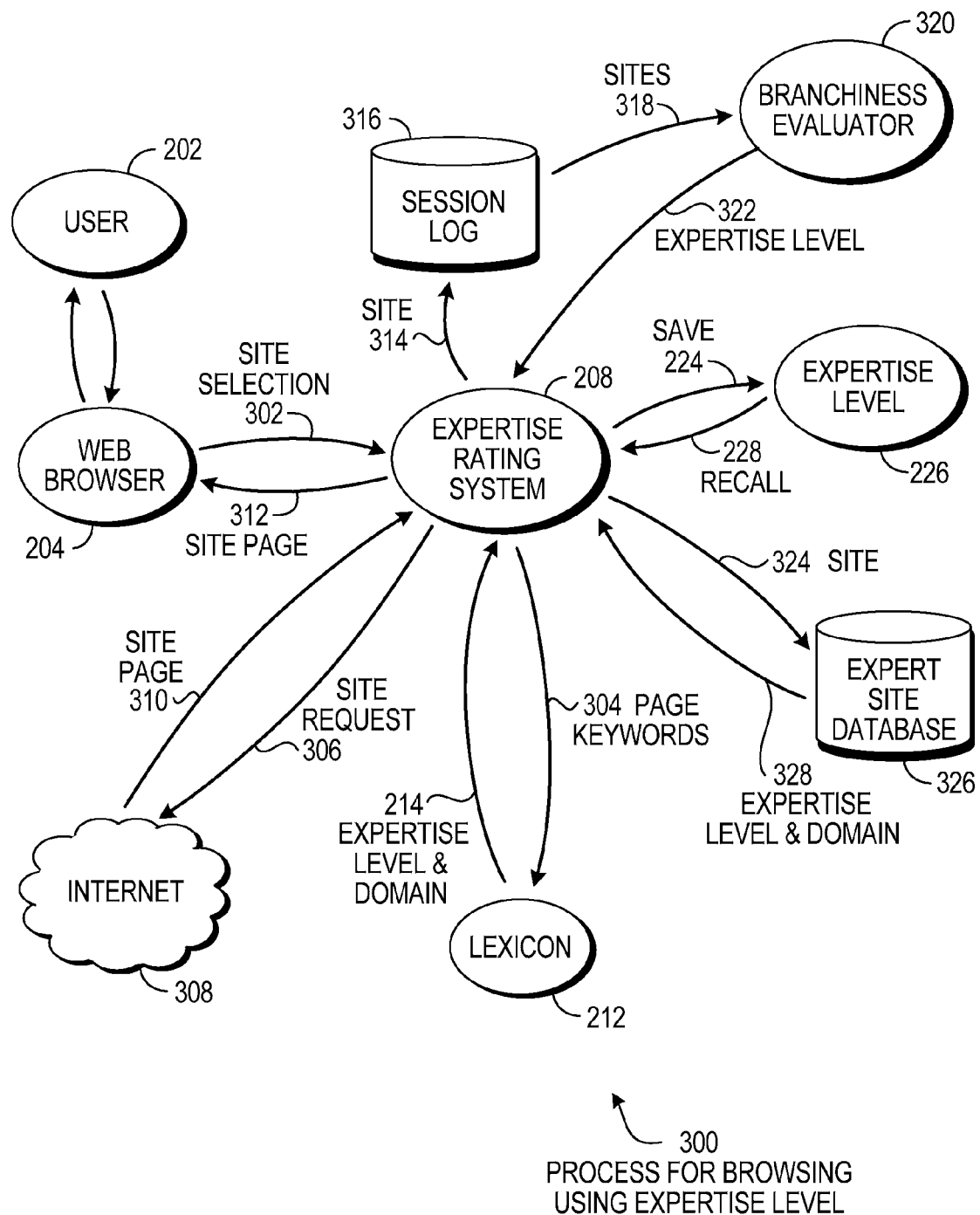
FIG. 3 is a process diagram illustration of an embodiment showing a process for evaluating a user expertise level based on a user's browsing behavior.

FIG. 3 is a process illustration of an embodiment 300 showing a process determining a user's expertise level from browsing behaviors. Embodiment 300 is a simplified example of some of the steps that may occur when monitoring a user's browsing behavior and determining an expertise level based on branchiness, the sites visited during one or more browsing sessions, and/or other similar features of the users' querying and browsing behavior during one or more search sessions.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of some of the functional elements and steps performed by those functional elements to determine a user's expertise level in a particular technical domain from a user's browsing behavior. Embodiment 300 is similar to embodiment 200, in that an expertise rating system 208 may perform similar analyses. In some embodiments, one or more of the functions of embodiment 200 and embodiment 300 may be combined.

Embodiment 300 shows a user 202 that may interact with a web browser 204. The user 202 may be able to select a website and send a site selection 302 to an expertise rating system 208. The browser 204 may allow a user 202 to select a website through several different mechanisms. Many browsers may have a text box in which a Uniform Resource Locator (URL) or Internet Protocol (IP) address may be entered to access a specific website or web page. Many browsers may also have a bookmark system whereby an address to a website or web page may be stored and recalled.

In many cases, a site may be selected from another site or web page. Many web pages have hyperlinks or other mechanisms by which another web page may be selected. In one instance, such a web page may be a search results page that may display many links to different websites as the result of a query. In some cases, the query may be the same query discussed in Embodiment 200.

The expertise rating system 208 may receive a site selection 302 from a web browser 204 and determine a user's expertise level 226 from at least one of several different factors.

The expertise rating system 208 may determine a user's expertise level 226 by determining an expertise level for the requested website. In general, an expert in a technology domain may request and visit those websites that are more complex and are visited by other experts. Thus, by analyzing the requested site, a user expertise in a domain may be inferred.

A varying degree of expertise may be inferred by how a user selects a website. When a user selects a website from a list of search results, a small correlation may be inferred about the user's expertise, as opposed to a website that is selected from a bookmark, from which a higher degree of correlation of expertise may be inferred. The presumption being that a website selected from a bookmark is one that is previously visited and from which the user found something of value. By analyzing websites favored by a user, an estimation of the user's expertise can be drawn.

One mechanism for determining an expertise level for a website may be to scan one or more web pages within a website for keywords. The page keywords 304 may be analyzed by the lexicon 212 to return an expertise level and knowledge domain 214. The lexicon 212 may be the same lexicon 212 used and discussed in Embodiment 200. In many embodiments, the expertise rating system 208 may send a site request 306 to the website on the Internet 308 and receive the site page 310. Prior to or in parallel with sending the site page 312 to the web browser 204 for display, the expertise rating system 208 may determine an expert level for the user in the technical domain.

Another mechanism for determining an expertise level for a website may be to query an expert site database 326. The expert site database 326 may receive a site 324 and return an expertise level and domain 328 based on the second level domain, third level domain, or individual pages within a website.

In many embodiments, an expertise rating system 208 may send the site 314 to a session log 316. A branchiness evaluator 320 may analyze the contents of the session log 316 to determine an expertise level 322. In many cases, the greater the branchiness of a user's search, the higher level of user expertise in a technical domain.

The session log 316 may be implemented differently in various embodiments. In many cases, a web browser 204 may keep a session log. In some cases, a proxy or firewall may keep a session log that may be analyzed by a branchiness evaluator. In some cases, an expertise rating system 208 may keep a separate session log.

The branchiness evaluator 320 may determine the relative branchiness of a user's browsing and searching patterns. In many cases, experts in a technology field may perform searches with many branches and may evaluate different sources of information on a single topic. Novices, on the other hand, tend to find a single source and stop their search. The branchiness evaluator 320 may analyze some or all of a session log 316 to determine how many branches were performed by a user, and thus give an expertise level 322.

The expertise rating system 208 may determine an expertise level based on the session length from the session log 316. In many cases, experts in a technical domain have longer and more extensive browsing sessions than do novices. In some embodiments, the branchiness evaluator 320 may assess the session length to determine an expertise level.

Similar to Embodiment 200, a user's expertise level 226 may be saved 224 and recalled 228 with each analysis and update of the user's expertise level.

In many embodiments, the expertise rating system 208 may use many different factors to estimate a user's expertise level for a particular technology domain. Some embodiments may use one or more of the various mechanisms discussed above in different combinations to estimate a user's expertise level. The mechanisms include analysis of search queries, analysis of visited sites, branchiness of a browsing session, and length of browsing sessions.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   monitoring a web browser session by a user;
   identifying a search query submitted by said user;
   identifying a set of technical words in said search query;
   comparing said technical words to a technical lexicon, said technical lexicon comprising domain specific technical words and user expertise level corresponding to said specific technical words;
   determining a user expertise level based on said technical words in said technical lexicon;
   determining search results based on said search query;
   organizing said search results based on said user expertise level to determine a ranked list of search results; and
   presenting said ranked list of search results.

2. The method of claim 1, said search results being additionally determined using said user expertise level.

3. The method of claim 1 further comprising storing said user expertise level.

4. The method of claim 3 further comprising updating said user expertise level based on a subsequent web browser session.

5. The method of claim 1, said search results comprising a grouping.

6. The method of claim 1 further comprising:
   determining a selected site from said web browser session;
   determining an expert rating for said selected site; and
   updating said user expertise level based on said expert rating.

7. The method of claim 6 further comprising:
   determining a visit length for said selected site; and
   updating said user expertise level based on said expert rating.

8. The method of claim 6, said determining an expert rating for said selected site comprising:
   analyzing said selected site using said technical lexicon to determine said expert rating for said selected site.

9. The method of claim 6, said selected site being selected from said search results.

10. The method of claim 6, said selected site being browsed to by said user.

11. The method of claim 1 further comprising:
    monitoring said web browsing session to determine a branchiness factor for said session; and
    updating said user expertise level based on said branchiness factor.

12. A system comprising:
    a lexicon comprising technical words, said technical words being related to a technical domain and said technical words having a predefined user expertise level;
    an expertise rating system configured to:
      receive a search query;
      determine one or more technical search terms from said query; and
      determine an expertise rating based on said technical search terms using said lexicon; and
    a search system configured to:
      perform a search using said search query and generate search results; and
      present said search results based on said expertise level.

13. The system of claim 12, said expertise rating system further configured to update an expertise rating for a particular user.

14. The system of claim 13, said expertise rating being stored on a local storage device.

15. The system of claim 13, said expertise rating being stored on a remote storage device, said expertise rating is stored without any personally identifiable information.

16. The system of claim 15, said expertise rating being stored on a remote storage device, said particular user having given permission for said expertise rating to be stored.

17. A method comprising:
monitoring a web browser session by a user;
determining a first expertise level associated with a first domain for said user;
identifying a website browsed to by said user;
determining an expertise level and a first technical domain associated with said website by identifying at least one keyword, looking up said at least one keyword in a lexicon, said lexicon comprising technical words having a predefined user expertise level, and determining said expertise level from said lexicon; and
updating said first expertise level associated with said first technical domain for said user.

18. The method of claim 17 further comprising:
receiving a query from said user;
determining that said query is related to said first domain;
searching a lexicon to determine a technical ranking for said query; and
updating said first expertise level associated with said first domain for said user based on said technical ranking of said query.

19. The method of claim 17, for each of a plurality of domains, said user having a different expertise level.

20. The method of claim 17, said website being browsed to from a group of search results.

* * * * *